(12) United States Patent
Hirata (10) Patent No.: US 6,219,312 B1
(45) Date of Patent: Apr. 17, 2001

(54) TIMER RESERVATION APPARATUS OF DISK RECORDING AND REPRODUCING APPARATUS AND TIMER RESERVATION INFORMATION RECORDED DISC

(75) Inventor: Shoji Hirata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/318,260

(22) Filed: May 25, 1999

(30) Foreign Application Priority Data

May 26, 1998 (JP) .............................................. P10-144432

(51) Int. Cl.[7] .................................................. G11B 17/22
(52) U.S. Cl. .............................................. 369/33; 369/47.1
(58) Field of Search ................................. 369/33, 32, 19, 369/47, 48; 386/83

(56) References Cited

U.S. PATENT DOCUMENTS

| | | | |
|---|---|---|---|
| 5,166,911 | * 11/1992 | Misawa et al. | 368/10 |
| 5,343,450 | * 8/1994 | Hamoda et al. | 369/19 |
| 5,410,369 | * 4/1995 | Nakajima | 348/730 |
| 5,499,102 | * 3/1996 | Hashimoto | 358/335 |
| 5,517,256 | * 5/1996 | Hashimoto | 348/731 |
| 5,543,933 | * 8/1996 | Kang et al. | 386/83 |
| 5,608,534 | * 3/1997 | Park et al. | 386/83 |
| 5,793,928 | * 8/1998 | Shim | 386/83 |
| 5,943,304 | * 8/1999 | Kamada et al. | 369/34 |
| 5,999,497 | * 12/1999 | Ochiai et al. | 369/2 |

FOREIGN PATENT DOCUMENTS

| | | | |
|---|---|---|---|
| 6-020382 | 1/1994 | (JP) . | |
| 11-120646 | * 4/1999 | (JP) | 369/33 |
| 11-339376 | * 12/1999 | (JP) | 369/33 |

* cited by examiner

Primary Examiner—Tan Dinh
(74) Attorney, Agent, or Firm—Ronald P. Kananen; Rader, Fishman & Grauer (57) ABSTRACT

A timer reservation apparatus of a disc recording and reproducing apparatus comprise a timer reservation information memorizing means for memorizing a timer reservation information signal; a timer reservation information recording means for recording in a predetermined area of a disc a timer reservation information signal for a disc recording and reproducing apparatus as well as a control signal indicating whether to allow or to prohibit execution of a timer reservation by the timer reservation information signal memorized in the timer reservation information memorizing means; a timer reservation information reproducing means for reproducing the timer reservation information signal as well as the control signal recorded in a predetermined area of a disc; and a timer reservation executing means for executing the timer reservation based on the timer reservation information signal read out from the timer reservation information memorizing means as well as the timer reservation information signal and the control signal reproduced by the timer reservation information reproducing means, so that the relation between timer reservation information registered on a disc recording and reproducing apparatus side and timer reservation information recorded on a disc side can be adjusted by giving the timer reservation information recorded on the disc side an initiative.

6 Claims, 3 Drawing Sheets

TIMER RESERVATION APPARATUS OF DISK RECORDING AND REPRODUCING APPARATUS AND TIMER RESERVATION INFORMATION RECORDED DISC

BACKGROUND OF THE INVENTION

1. Field of the Invention

The present invention relates to a timer reservation apparatus of a disc recording and reproducing apparatus and a disc in which timer reservation information is recorded.

2. Description of the Related Art

In the Japanese laid-open patent publication No. 6-20382, an optical disc apparatus is described in which a timer reservation information on a recording reservation and a reproducing reservation for an optical disc apparatus is recorded in an optical disc. By reading out the timer reservation information recorded in the optical disc, a timer reservation of recording reservation and the reproducing reservation for optical disc apparatus is carried out.

According to such optical disc apparatus, there are advantages such that a timer reservation can be carried out with an optical disc as a unit, a plurality of the timer reservation information can be recorded, verification of the timer reservation information becomes easier, rerecording of the timer reservation information signal due to a power failure becomes unnecessary, the information signals to be recorded in the optical disc by the timer reservation can be sorted out at every disc and even if there exist a plurality of the optical disc apparatuses, the optical disc side can take an initiative in recording the information signal by the timer reservation and as a result, there is no fear that an important information signal recorded in the optical disc is erased due to overlap-recording of other information signal or the like.

By the way, in a case where a timer reservation information signal for a disc recording and reproducing apparatus is about to be recorded in a disc, relations between timer reservation information on a timer reservation information signal recorded in the disc and timer reservation information on a timer reservation information signal registered with recording and reproducing apparatus itself become a problem. To cite one example, when the respective timer reservation information on both the timer reservation information signals overlap each other in terms of time, there is a need to adjust them.

SUMMARY OF THE INVENTION

In view of such a point, an object of the present invention is to propose a timer reservation apparatus of a disc recording and reproducing apparatus which can adjust the relations between the timer reservation information on the timer reservation information signal registered with a disc recording and reproducing apparatus side and the timer reservation information on the timer reservation information signal recorded in a disc side by making the timer reservation information on the timer reservation information signal recorded in the disc side have an initiative.

Also, an other object of the present invention is to propose a disc wherein is recorded timer reservation information capable of adjusting the relations between the timer reservation information on the timer reservation information signal registered with the disc recording and reproducing apparatus side and the timer reservation information on the timer reservation information signal recorded in the disc side.

According to an aspect of the present invention, there is provided a timer reservation apparatus of a disc recording and reproducing apparatus which comprises a timer reservation information memorizing means for memorizing a timer reservation information signal; a timer reservation information recording means for recording in a predetermined area of the disc a timer reservation information signal for a disc recording and reproducing apparatus as well as a control signal indicating whether to allow or to prohibit execution of the timer reservation by the timer reservation information signal memorized in the timer reservation information memorizing means; a timer reservation information reproducing means for reproducing the timer reservation information signal as well as the control signal recorded in the predetermined area of the disc; and a timer reservation executing means for executing the timer reservation based on the timer reservation information signal read out from the timer reservation information memorizing means as well as the timer reservation information signal and the control signal reproduced by the timer reservation information reproducing means.

According to such the present invention, the timer reservation information signal for the disc recording and reproducing apparatus as well as the control signal indicating whether to allow or to prohibit the execution of the timer reservation by the timer reservation information signal memorized in the timer reservation information memorizing means are recorded in the predetermined area of the disc by the timer reservation information recording means, and the timer reservation information signal and the control signal recorded in the predetermined area of the disc are reproduced by the timer reservation information reproducing means and the timer reservation is executed by the timer reservation executing means based on the timer reservation information signal read out from the timer reservation information memorizing means memorizing the timer reservation information signal as well as the timer reservation information signal and the control signal reproduced by the timer reservation information reproducing means.

BRIEF SUMMARY OF THE INVENTION

A first aspect of the invention is a timer reservation apparatus of a disc recording and reproducing apparatus, which comprises a timer reservation information memorizing means for memorizing a timer reservation information signal; a timer reservation information recording means for recording in a predetermined area of a disc a timer reservation information signal for a disc recording and reproducing apparatus as well as a control signal indicating whether to allow or to prohibit execution of a timer reservation by a timer reservation information signal memorized in the timer reservation information memorizing means; a timer reservation information reproducing means for reproducing the timer reservation information signal as well as the control signal recorded in the predetermined area of the disc; and a timer reservation information executing means for executing the timer reservation based on the timer reservation information signal read out from the timer reservation information memorizing means as well as the timer reservation information signal and the control signal reproduced by the timer reservation information reproducing means.

A second aspect of the invention is a timer reservation apparatus of a disc recording and reproducing apparatus of the first invention, having an arrangement such that in the timer reservation apparatus of the disc recording and reproducing apparatus, in a case where the control signal is a signal which allows execution of the timer reservation by the timer reservation information signal memorized in the timer reservation information memorizing means, when timer reservation information on a timer reservation information signal memorized in the timer reservation information memorizing means and timer reservation information on a timer reservation information signal reproduced by the timer reservation information memorizing means overlap each other in terms of time, the timer reservation executing means executes the execution of the timer reservation based on the timer reservation information on the timer reservation information signal reproduced by the timer reservation information reproducing means.

A third feature of the invention is a timer reservation apparatus of a disc recording and reproducing apparatus of the first invention, having an arrangement such that in the timer reservation apparatus of the disc recording and reproducing apparatus, in a case where the timer reservation information on the timer reservation information signal reproduced by the timer reservation information reproducing means overlap each other in terms of time with respect to a recording reservation and a reproducing reservation, the timer reservation information executing means executes the timer reservation based on the timer reservation information on the timer reservation information signal for the recording reservation.

A fourth invention is a timer reservation apparatus of a disc recording and reproducing apparatus having an arrangement such that in the timer reservation apparatus of the disc recording and reproducing apparatus of the first invention, in a case where the timer reservation information on the timer reservation information signal reproduced by the timer reservation information reproducing means and the timer reservation information on timer reservation information signal about to be recorded in the predetermined area of the disc by the timer reservation information recording means are both the recording reservation or the reproducing reservation and overlap each other in terms of time, the timer reservation information executing means is provided with a detecting means for detecting the time overlap and a notifying means for notifying the time overlap based on a detecting output by the detecting means.

A fifth invention is a timer reservation apparatus of a disc recording and reproducing apparatus, having an arrangement such that in the timer reservation apparatus of the disc recording and reproducing apparatus, of the first invention, there are provided: a first judging means for judging whether or not to record the same program every day or every week in a disc; a second judging means for judging whether or not there remains an area in the disc to record a program therein when it is judged by the first judging means that the same program is to be recorded in the disc every day or every week; a first notifying means for notifying a user whether or not it is good to erase a previously recorded program when it is judged by the second judging means that there does not remain any area in the disc for recording the program; a third judging means for judging whether or not it is good to erase the previously recorded program based on user's judgement; an erasing means for erasing the previously recorded program when it is judged good by the third judging means that the previously recorded program can be erased; a memory controlling means for memorizing in the timer reservation information memorizing means the timer reservation information signal as well as the control signal memorized in the predetermined area of the disc, which are reproduced by the timer reservation information reproducing means, when it is judged by the third judging means that the previously recorded program is not to be erased; a disc ejecting control means for ejecting the disc after the timer reservation information signal as well as the control signal recorded in the predetermined area of the disc are reproduced by the timer reservation information reproducing means and memorized in the timer reservation information memorizing means; a second notifying means for notifying the user that a new disc is loaded so that the timer reservation information as well as the control signal of the old disc memorized in the timer reservation information memorizing means are to be recorded in a predetermined area of a new disc; and a fourth judging means for judging, after a new disc is loaded, whether or not the timer reservation information signal as well as the control signal in the old disc, memorized in the timer reservation information memorizing means are recorded in a predetermined area of the new disc, wherein when it is judged by the second judging means that there remains an area in the old disc for recording a program, the information signal is recorded in the old disc, and when it is judged by the fourth judging means that with a new disc loaded, the timer reservation information signal as well as the control signal in the old disc memorized in the timer reservation information memorizing means have been recorded in the predetermined area of the new disc, the information signal is recorded in the new disc.

A fourth feature of the invention is a disc being characterized in that a timer reservation information signal for the disc recording and reproducing apparatus and the control signal indicating whether to allow or to prohibit the execution of timer reservation information on the timer reservation information signal registered with a disc recording and reproducing apparatus side are recorded in a predetermined area thereof.

DESCRIPTION OF THE PREFERRED EMBODIMENTS

Figure 1:
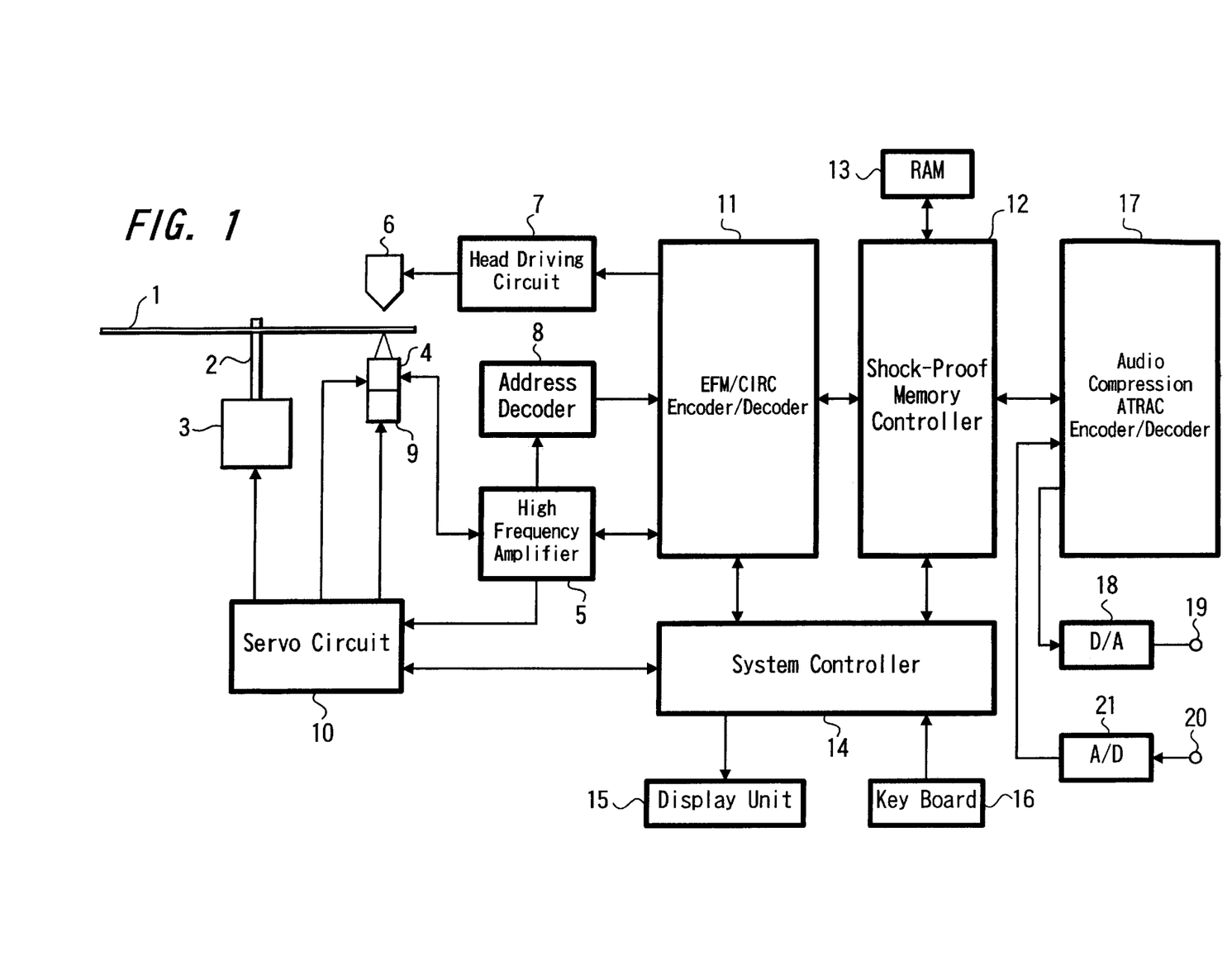
FIG. 1 is a block diagram showing circuits of the timer reservation apparatus of the disk recording and reproducing apparatus according to the embodiment of the present invention.

Hereafter, one example of disc recording and reproducing apparatuses as a concrete example of an embodiment of the present invention will be explained with reference to FIG. 1. In FIG. 1, reference numeral 1 is a mini-disc as an optical disc which has an information recording area wherein an audio signal (PCM audio signal) is recorded as well as a table of contents recording area (TOC recording area). A table of contents signal indicating information contents of an information signal to be recorded in the information recording area is to be recorded, and the table of contents recording area (TOC recording area) is provided on, for example, an innermost peripheral side thereof. The optical disc 1 as a mini-disc comprises an optical disc (magneto-optical disc) which is capable of recording as well as reproducing and an optical disc capable of only reproducing. Here, the optical disc (magneto-optical disc) capable of recording as well as reproducing is used and hereafter, is simply called an optical disc. A table of contents recording area (TOC recording area) of the optical disc is provided with a writable area and non-writable area and here, the writable table of contents recording area will be considered. Users data recording area is provided in a part of the writable table of contents recording area, and a timer reservation information signal can be recorded in, erased from, modification-recorded in and reproduced from the writable table of contents recording area.

Here is a case of recording an audio signal in the information recording area of the optical disc 1 as the mini-disc but when a DVD (Digital Video Disc) is used, a digitalized, compression-coded video signal can be recorded in the information recording area thereof.

The optical disc 1 is driven into rotation by a spindle motor 3 through a spindle 2. Reference numeral 4 is an optical head, and Reference numeral 6 is a magnetic head. At a time of recording, polarity magnetic fields corresponding to "1" and "0" of the information signal as well as the table of contents signal (TOC signal) are given by the magnetic head 6 to a part of the optical disc 1, which is heated at a more than Curie temperature by a focused laser beam from the optical head 4 so that the information signal as well as the TOC signal are recorded respectively in the information recording area as well as the writable table of contents area (TOC recording area). At a time of reproducing, a focused laser beam is irradiated on the optical disk 1 by the optical head 4, and by receiving a reflected laser beam, the information signal as well as the TOC signal recorded in the information recording area as well as the TOC recording area of the optical disc 1 are reproduced respectively.

Reference numeral 9 is a feed motor and by this feed motor 9, the optical head 4 is moved along the radius of the optical disc 1.

Reference numeral 10 is a servo circuit and servo is applied to the rotation of the spindle motor 3, focus and tracking servos are applied to the optical head 4 and the servo is applied to the feeding of the feed motor 9. The servo circuit 10 is controlled by a system controller (provided with a microcomputer) 14. A displaying unit 15 and a key board 16 are connected to the system controller 14.

Reference numeral 11 is an EFM (Eight to fourteen Modulation: 8–14 MODULATION)/CIRC (Cross Interleave Read-Solomon code: CROSS INTERLEAVE READ-SOLOMON CODE) encoder/decoder (circuit). At a time of recording, a laser diode driving signal from the circuit 11 is supplied to a laser diode of the optical head 4 through a high frequency amplifier 5 and at the same time, a cross-interleaved, EFM-modulated digital audio signal (music signal) from the circuit 11 is supplied to the magnetic head 6 through a driving circuit 7. At a time of reproducing, a reproduced high frequency signal from the optical head 4 is supplied to the circuit 11, an address decoder 8 and the servo circuit 10 through the high frequency amplifier 5. The reproduced high frequency signal is decrossinterleaved and EFM-demodulated in the circuit 11. Also, an address signal from the address decoder 8 is supplied to the circuit 11. The TOC signal, the address signal, a synchronizing signal, a sub-code signal and the like from the circuit 11 are supplied to the system controller 14. The circuit 11 is controlled by the system controller 14.

Reference numeral 13 is a RAM as a shock proof memory for compensating reproduction of the information signal, when the reproduction of the information signal is nor carried out for a short period of time due to a shock from the outside, and controlled by a shock-proof memory controller 12. Also, the controller 12 is controlled by the system controller 14.

Reference numeral 17 is an audio compression ATRAC (Adaptive Transform Acoustic Coding: ADAPTIVE TRANSFORM ACOUSTIC CODING) encoder/decoder and ATRAC-codes a digital audio signal obtained in an A/D converter 21 by converting an audio signal from an input terminal 20, supplies the same to the encoder/decoder 11 through the controller 12 and at the same time, expansion-ATRC demodulates a digital audio signal from the encoder/decoder 11, which is CRIC deinterleaved, EFM-demodulated through the controller 12 and supplies the same to a D/A converter 18. An analog audio signal is derived from the D/A converting unit 18 and delivered to an output terminal 19.

The reproduced audio signal from the output terminal 19 is supplied to a speaker and the like through a low frequency amplifier, a graphical showing of which is omitted. Also, a radio tuner is connected to the input terminal 20 through a low frequency amplifier, a graphical showing of which is omitted, and a radio audio signal from the radio tuner is supplied thereto. Then, a control signal from the system controller 14 is supplied to the radio tuner so that selection of a station based on the timer reservation information signal is carried out. In a case of a DVD recording and reproducing apparatus, a video signal (an audio signal is also included) from a television tuner is supplied to an A/D converter through a video amplifier. Then, the control signal from the system controller is supplied to the television tuner and selection of a station based on the timer reservation information signal is carried out.

Figure 2:
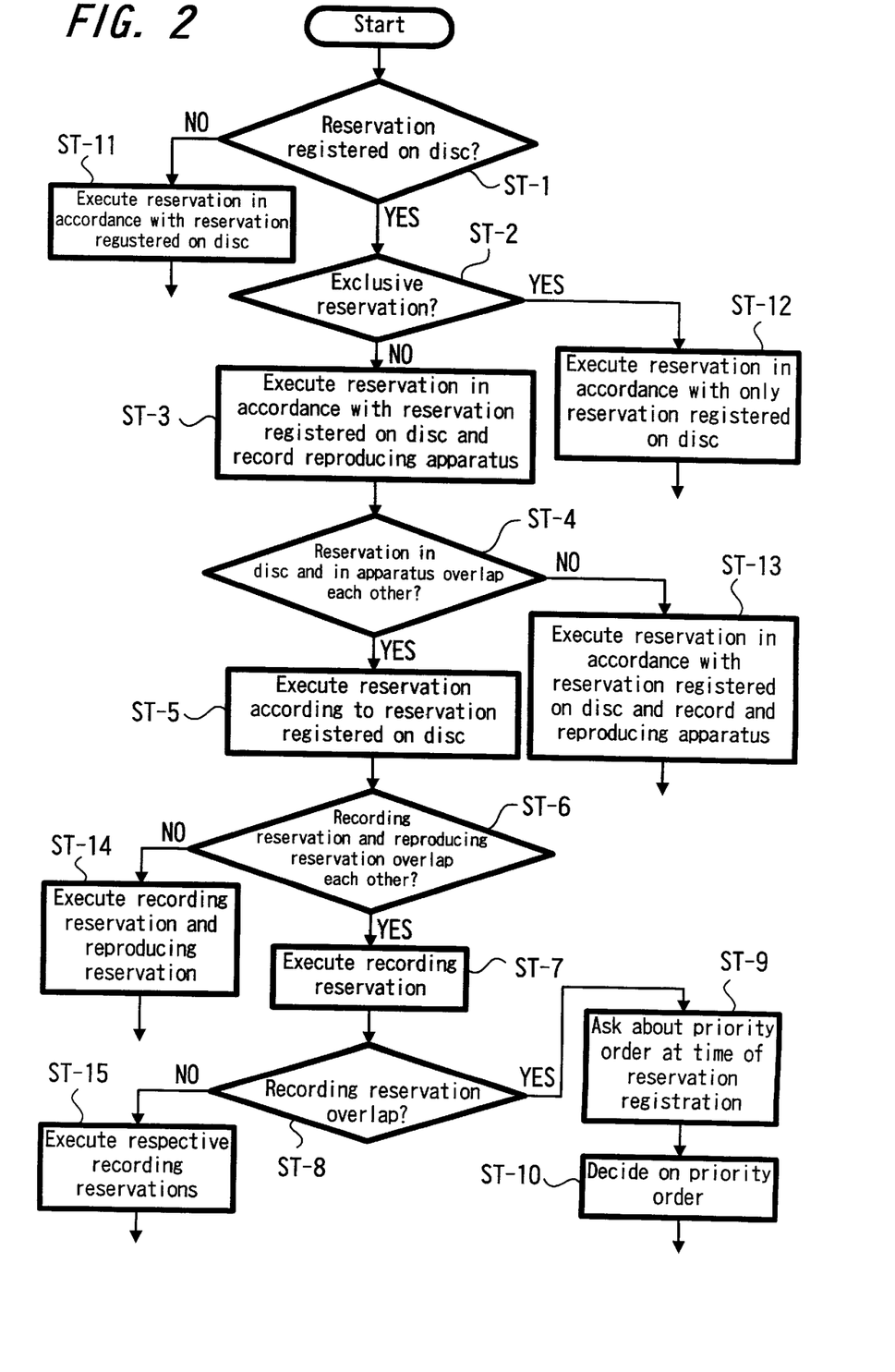
FIG. 2 is a flowchart showing operations and functions of a system controller of a timer reservation apparatus of a disc recording and reproducing apparatus according to the embodiment of the present invention.

Next, one example of functions and operations of the system controller 18 of the optical disc recording and reproducing apparatus as an example of the embodiment of the present invention will be explained with reference to the flowchart in FIG. 2. First of all, at step ST-1, the system controller 14 judges whether or not the timer reservation is registered with the optical disc 1 based on an reproducing output by the optical head 4 from a user's data recording area of the optical disc 1, that is judges whether or not the timer reservation information signal as well as the control signal indicating whether to allow or to prohibit execution of the timer reservation by the timer reservation information signal memorized in the timer reservation information memorizing means are recorded in the user's data recording area of the optical disc 1. When the judgement at step ST-1 is yes, the process proceeds to step ST-2 and when the judgement at step ST-1 is no, the process proceeds to step ST-11.

At step ST-2, the system controller 14 judges whether or not (a signal indicating an ordinary reservation) the control signal is a signal indicating an exclusive reservation based on a reproduction output by the optical head 4 from the user's data recording area of the optical disc 1, and when the judgement is yes, that is, an exclusive reservation, the process proceeds to step ST-12 and when the judgement is no, that is, an ordinary reservation, the process proceeds to step ST-3.

At step ST-3, the system controller 14 executes the timer reservation in accordance with the timer reservation registered with the optical disc 1 as well as the optical disc recording and reproducing apparatus, that is, the timer reservation information on the timer reservation information signal reproduced by the optical head 4 from the user's data recording area of the optical disc 1 as well as the timer reservation information on the timer reservation information signal read out from the memory (RAM) of the system controller 14. The execution of the timer reservation is concretely such that a broadcast on a designated receiving frequency (in a case of a video signal, a channel number) and by a designated program's name based on the timer reservation information is recorded in the optical disc 1 from respectively a designated starting time to a finishing time, and audio signals such as the music signal and the like of a designated music's name recorded in the optical disc 1 are reproduced from respectively designated starting times to finishing times from the optical disc 1. Next to step ST-3, the process proceeds to step ST-4.

At step ST-4, the system controller 14 judges whether or not the respective timer reservation information on the timer reservation information signal registered with the optical disc 1 as well as the optical disc recording and reproducing apparatus, that is, the timer reservation information signal recorded in the user's data recording area of the optical disc 1 and the timer reservation information signal memorized in the memory (RAM) of the system controller 14 of the optical disc recording and reproducing apparatus overlap each other in terms of time and when the judgement is yes, the process proceeds to step ST-5, and when it is no, the process proceeds to step ST-12.

At step ST-5, in accordance with a reservation registered with the optical disc 1, that is, based on the timer reservation information on the timer reservation information signal reproduced by the optical head 4 from the user's data recording area of the optical disc 1, the system controller 14 executes the timer reservation. Next to step ST-5, the process proceeds to step ST-6.

At step ST-6, the system controller 14 judges whether or not the recording reservation and the reproducing reservation overlap each other in terms of time, and when the judgement is yes, the process proceeds to step ST-7 and when it is no, the process proceeds to step ST-14.

At step ST-7, the system controller 14 prioritizes and executes the recording reservation. Next to step ST-7, the process proceeds to step ST-8.

At step ST-8, the system controller 14 judges whether or not the recording reservation overlaps in terms of time, and when the judgement is yes, the process proceeds to step ST-9 and when it is no, the process proceeds to step ST-15.

At step ST-9, the system controller 14 asks the user by, for example, the displaying unit 15 about the priority order between the time reservation information based on an input of the timer reservation information signal by the key board 16 and the timer reservation information on the timer reservation information signal already recorded in the user's data recording area of the optical disc 1. Next to step S-9, the process proceeds to step S-10.

At step ST-10, the user decides on the priority order between the timer reservation information based on an input of the timer reservation information signal by the key board 16 and the timer reservation information on the timer reservation signal already recorded in the user's data recording area of the optical disc 1. That is, the timer reservation information signal inputted by the user's key board 16 is spared and recorded in the user's data recording area of the optical disk 1 while the timer reservation information signal already recorded in the user's data recording area of the optical disc 1 is erased, or the timer reservation information signal recorded in the user's data recording area of the optical disc 1 is spared while the timer reservation information signal inputted by the user's key board 16 is erased. Such operations are carried out by the user operating the key board 16.

Next to step ST-10, the process is supposed to return directly to step ST-1 or return to step ST-1 via another step.

When the judgement is no at step ST-1, that is, when the timer reservation is not registered with the optical disc 1, that is, when the timer reservation information signal is not recorded in the user's data recording area of the optical disc 1, the system controller 14 executes the timer reservation in accordance with the timer reservation information signal memorized in the memory (RAM) of the system controller 14 of the optical disc recording and reproducing apparatus. After step ST-11, after a process and the like similar to steps ST-6, 7, 8, 9, 10, 14 and 15 are carried out, the process returns to step ST-1.

When the judgement is yes at step ST-2, that is, when the control signal together with the timer Reservation information signal reproduced by the optical head 4 together with the timer reservation information signal from the user's data recording area of the optical disc 1 is a signal indicating an exclusive reservation, the process proceeds to step ST-12 wherein the system controller 14 executes the timer reservation in accordance with the timer reservation information on the timer reservation information signal recorded in the user's data recording area of the optical disc 1. Next to step ST-12, after a process and the like similar to steps ST-6, 7, 8, 9, 10, 14 and 15 are carried out, the process returns to step ST-1.

When the judgement is no at step ST-4, that is, the timer reservation information on the timer reservation information signals registered with the optical disc 1 as well as the optical disc recording and reproducing apparatus does not overlap in terms of time, the process proceeds to step ST-13, and the system controller 14 executes the timer reservation in accordance with the timer reservation information on the timer reservation information signals registered with the optical disc 1 as well as the optical disc recording and reproducing apparatus. Next to step ST-13, the process returns directly to step ST-1 or returns to step ST-1 via another step.

When the judgement is no at step ST-6, that is, when the recording reservation and the recording reservation do not overlap each other, the process proceeds to step ST-14 and the system controller 14 executes the recording reservation and the reproducing reservation. Next to step ST-14, the process returns directly to step ST-1 or returns to step ST-1 via another step.

When the judgement is no at step ST-8, that is, when the recording reservation does not overlap, the process proceeds to step ST-15, and the system controller 14 executes respective recording reservations. Next to step ST-15, the process returns directly to step ST-1 or returns to step ST-1 via another step.

Figure 3:
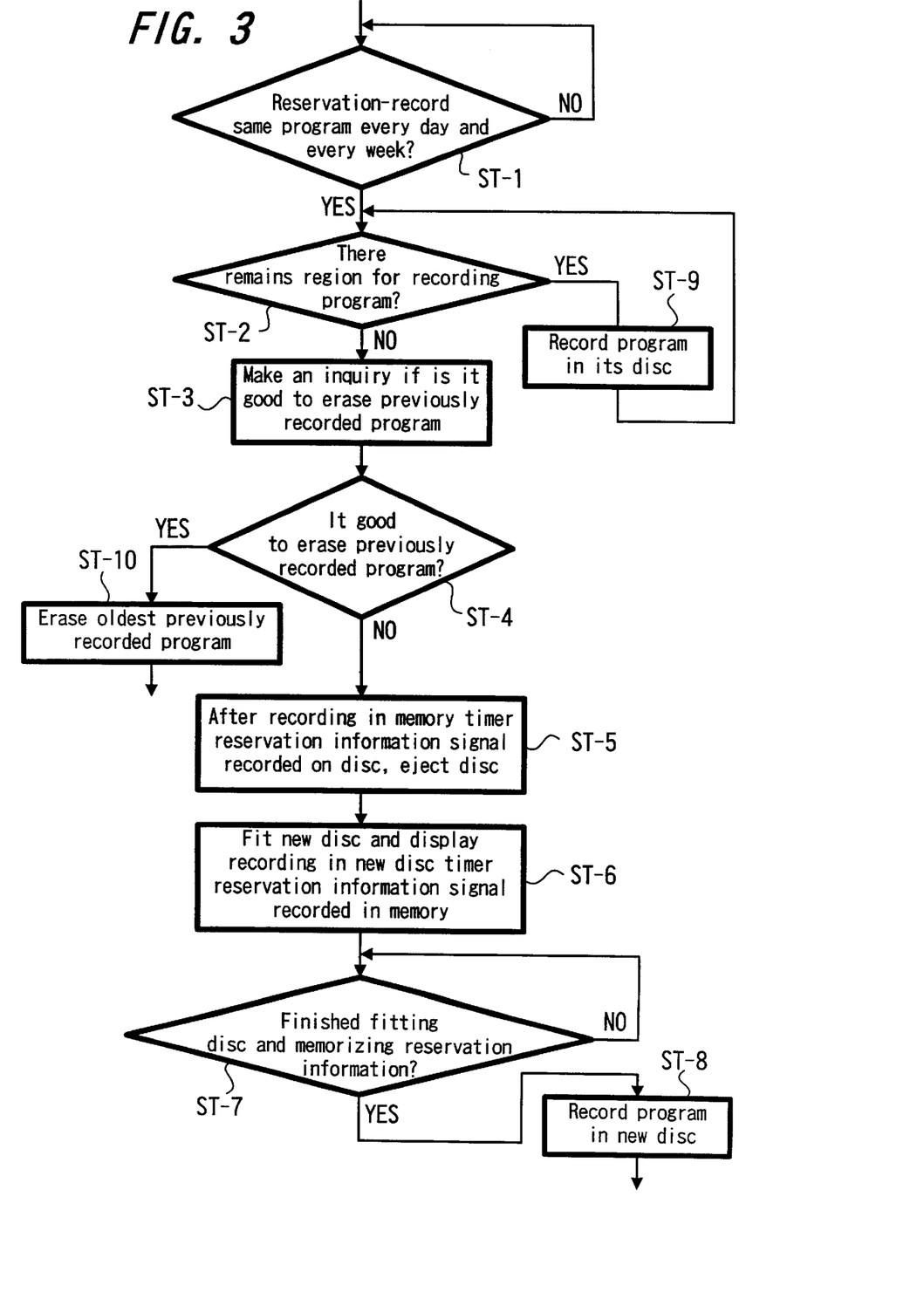
FIG. 3 is a flowchart showing operations and functions of the system controller of the timer reservation apparatus of the disc recording and reproducing apparatus according to the embodiment of the present invention.

Nextly, another concrete example of the disc recording and reproducing apparatus of the embodiment of the present invention will be explained with reference to the flowchart in FIG. 3. At step ST-1, the system controller 14 judges whether or not to record the same program every day or every week and when the judgement is yes, the process proceeds to step ST-2 and when it is no, the process returns to step ST-1.

At step ST-2, the system controller 14 judges whether or not there remains an area for recording a program in the optical disc 1 and when the judgement is yes, the process proceeds to step ST-9 and when it is no, the process returns to step ST-3.

At step ST-3, the user is notified (informed) of an inquiry whether or not it is good to erase the program previously recorded in the optical disc 1 by using, for example, the displaying unit 15 under the control of the system controller 14. Next to step ST-3, the process proceeds to step ST-4.

At step ST-4, based on a reply by key board 16 whether or not it is good to erase the program previously recorded in the optical disc 1, the system controller 14 judges whether or not it is good to erase the program recorded previously in the optical disc 1 and when the judgement is yes, the process proceeds to step ST-10 and when it is no, the process proceeds to step ST-5.

At step ST-5, based on the control of the system controller 14, after the timer reservation information signal (the control signal is included) recorded in an old optical disc 1 is memorized in the memory (RAM) of the system controller 14, the old optical disc 1 is ejected outside. Next to step ST-5, the process proceeds to step ST-6.

At step ST-6, based on the control of the system controller 14, the user is notified by, for example, a display by the displaying unit 15 that a new optical disc 1 is loaded on the disk recording and reproducing apparatus and the timer reservation information signal memorized in the memory (RAM) of the system controller 14 is about to be recorded in a user's data recording area (provided in a part of the table of contents recording area) of the new optical disc 1. Next to step ST-6, the process proceeds to step ST-7.

At step ST-7, the system controller 14 judges whether or not the new optical disc 1 has finished being loaded on the disc recording and reproducing apparatus as well as whether or not the timer reservation information signal memorized in the memory (RAM) of the system controller 14 which was memorized in the old optical disc 1 has been recorded in the users data recording area of the new optical disc 1 completely and when the judgement is no, the process returns to step ST-7 and when it is yes, the process proceeds to step ST-8.

At step ST-8, the program is newly recorded in the new disc under the control of system controller 14. Next to step ST-8, the process returns directly or via another step to step ST-2.

When the judgement is yes at step ST-2, that is, when there remains an area for recording the program, the process proceeds to step ST-9 and after the program is recorded in the old optical disc 1, the process returns to step ST-2.

When the judgement is yes at step ST-4, that is, when it is judged good that the program previously recorded in the old optical disc 1 is erased, the process proceeds to step ST-10 and the oldest program previously recorded in the optical disc 1 is erased. Next to step ST-1, after another step or directly the process returns to step ST-2.

Meanwhile, a disc may be other kinds of discs such as a magnetic disc and the like. In the case of a recording and reproducing apparatus which manages a plurality of discs, when there is an overlap, a disc with a smaller number is prioritized.

According to first feature of the invention, there are provided: a timer reservation information memorizing means for memorizing a timer reservation information signal; a timer reservation information recording means for recording in a predetermined area of a disc a timer reservation information signal for a disc recording and reproducing apparatus as well as a control signal indicating whether to allow or to prohibit execution of a timer reservation by the timer reservation information signal memorized in the timer reservation information memorizing means; a timer reservation information reproducing means for reproducing the timer reservation information signal as well as the control signal recorded in the predetermined area of the disc; and a timer reservation executing means for executing the timer reservation based on the timer reservation information signal read out from the timer reservation information memorizing means as well as the timer reservation information signal and the control signal reproduced by the timer reservation information reproducing means, whereby it is possible to obtain a timer reservation apparatus of a timer recording and reproducing apparatus capable of adjusting relations between the timer reservation information on the timer reservation information signal registered with a disc recording and reproducing apparatus side and the timer reservation information on the timer reservation information signal recorded in a disc side by giving an initiative to the timer reservation information on the timer reservation information signal recorded in the disc side.

Also, according to the first aspect of the invention, there are advantages such that like the conventional example, a timer reservation can be carried out with an optical disc as a unit, a number of the timer reservation information can be recorded, verification of the timer reservation information becomes easier, rerecording of the timer reservation information signal due to a power failure becomes unnecessary, the information signals to be recorded in the optical discs by the timer reservation can be sorted out at every disc and even if there exist a plurality of the optical disc apparatuses, the optical disc side can take an initiative in recording the information signal by the timer reservation and as a result, there is no fear that an important information signal recorded in the optical disc is erased due to overlap-recording of other information signal or the like.

According to a second aspect of the invention, as there is provided an arrangement such that in the timer reservation apparatus of the disc recording and reproducing apparatus of the first invention, in a case where the control signal is a signal which allows execution of the timer reservation by the timer reservation information signal memorized in the timer reservation information memorizing means, when timer reservation information on timer reservation information signal memorized in the timer reservation information memorizing means and timer reservation information on timer reservation information signal reproduced by the timer reservation information memorizing means overlap each other in terms of time, the timer reservation executing means executes the execution of the timer reservation based on the timer reservation information on the timer reservation information signal reproduced by the timer reservation information reproducing means and hence, it is possible to obtain a timer reservation apparatus of a disk recording and reproducing apparatus capable of adjusting the relations between the timer reservation information on the timer reservation information signal registered with the disc recording and reproducing apparatus side and the timer reservation information on the timer reservation information signal recorded in a disc side by giving an initiative as well as a priority to the timer reservation information on the timer reservation information signal recorded in the disc side.

According to the third feature of the invention, as there is provided an arrangement such that in the timer reservation apparatus of the disc recording and reproducing apparatus, in a case where the timer reservation information on the timer reservation information signal reproduced by the timer reservation information reproducing means overlap each other in terms of time with respect to the recording reservation and the reproducing reservation, the timer information executing means executes the timer reservation based on timer information on the timer reservation information signal for the recording reservation, so that it is possible to obtain the timer reservation apparatus of the disc recording and reproducing apparatus capable of prioritizing the recording reservation against the reproducing reservation in addition to the first invention.

According to the fourth aspect of the invention, in the timer reservation apparatus of the disc recording and reproducing apparatus of the first invention, in a case where the timer reservation information on the timer reservation information signal reproduced by the timer reservation information reproducing means and the timer reservation information on timer reservation information signal about to be recorded in the predetermined area of the disc by the timer reservation information recording means are both a recording reservation or a reproducing reservation and overlap each other in terms of time, as the timer reservation information executing means are provided with a detecting means for detecting the time overlap as well as a notifying means for notifying the time overlap based on a detecting output by the detecting means, in addition to the first invention, it is possible to obtain the timer reservation apparatus of the disc recording and reproducing apparatus which, in a case where the timer reservation information on the timer reservation information signal reproduced by the timer reservation information reproducing means and the timer reservation information on the timer reservation information signal about to be recorded in the predetermined area of the disc by the timer reservation information recording means are both the recording reservations or the reproducing reservations, and overlap each other in terms of time, can prioritize any one of them by the judgement of the user.

According to a fifth aspect of the invention, in the timer reservation apparatus of the disc recording and reproducing apparatus, of the first invention, there are provided: a first judging means for judging whether or not to record the same program every day or every week in a disc; a second judging means for judging whether or not there remains an area in the disc to record a program therein when it is judged by the first judging means that the same program is to be recorded in the disc every day or every week; a first notifying means for notifying a user whether or not it is good to erase a previously recorded program when it is judged by the second judging means that there does not remain any area in the disc for recording the program; a third judging means for judging whether or not it is good to erase the previously recorded program based on user's judgement; an erasing means for erasing the previously recorded program when it is judged good by the third judging means that the previously recorded program is to be erased; a memory controlling means for memorizing in the timer reservation information memorizing means the timer reservation information signal as well as the control signal memorized in the predetermined area of the disc, which are reproduced by the timer reservation information reproducing means, when it is judged by the third judging means that the previously recorded program is not to be erased; a disc ejecting control means for ejecting the disc after the timer reservation information signal as well as the control signal recorded in the predetermined area of the disc are reproduced by the timer reservation information reproducing means and memorized in the timer reservation information memorizing means; a second notifying means for notifying the user that a new disc is loaded so that the timer reservation information as well as the control signal of the old disc memorized in the timer reservation information memorizing means is to be recorded in a predetermined area of the new disc; and a fourth judging means for, after a new disc is loaded, judging whether or not the timer reservation information signal as well as the control signal in the old disc, memorized in the timer reservation information memorizing means are recorded in a predetermined area of the new disc, and when it is judged by the second judging means that there remains an area in the old disc for recording the program, the information signal is recorded in the old disc, and when it is judged by the fourth judging means that with a new disc loaded, the timer reservation information signal as well as the control signal of the old disc memorized in the timer reservation information memorizing means have been recorded in the predetermined area of the new disc, the information signal is recorded in the new disc and hence, in addition to the first invention, it is possible to obtain the timer reservation apparatus of the disc recording and reproducing apparatus capable of surely recording the same program every day or every week.

According to the sixth aspect of the invention, the timer reservation information signal for the disc recording and reproducing apparatus and the control signal indicating whether to allow or to prohibit the execution of the timer reservation information on the timer reservation information signal registered with the disc recording and reproducing apparatus side are recorded in the predetermined area and hence, it is possible to obtain the disc wherein the timer reservation information is recorded, which is capable of adjusting relations between the timer reservation information on the timer reservation information signal registered with the disc recording and reproducing apparatus side and the timer reservation information on the timer reservation information signal recorded in the disc side.

Also, according to the sixth feature of the invention, there are advantages such that a timer reservation can be carried out with an optical disc as a unit, a number of the timer reservation information can be recorded, verification of the timer reservation information becomes easier, rerecording of the timer reservation information signal due to a power failure becomes unnecessary, the information signals to be recorded in the optical discs by the timer reservation can be sorted out at every disc and even if there exist a plurality of the optical discs, the optical disc side can take an initiative in recording the information signal by the timer reservation and as a result, there is no fear that an important information signal recorded in the optical disc is erased due to overlap-recording of other information signals.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A timer reservation apparatus of a disc recording and reproducing apparatus, comprising:
   a timer reservation memorizing means for memorizing a timer reservation signal;
   a timer reservation information recording means for recording at least a timer reservation information signal for a disc recording and reproducing apparatus and a control signal indicating whether to allow or to prohibit execution of a timer reservation by the timer reservation information signal memorized in said timer reservation memorizing means in a predetermined area of a disk;
   a timer reservation information reproducing means for reproducing at least said timer reservation information and said control signal recorded in a predetermined area of said disk; and a timer reservation executing means for executing a timer reservation based on the timer reservation information signal read out from said timer reservation information memorizing means and said timer reservation signal and said control signal reproduced by said timer reservation information reproducing means.

2. A timer reservation apparatus of a disk recording and reproducing apparatus as claimed in claim 1, wherein said timer reservation executing means, where said control signal is a signal allowing execution of a timer reservation of the timer reservation information signal memorized in said timer reservation information memorizing means, when the timer reservation information of timer reservation information signal memorized in said timer reservation information memorizing means and timer reservation information on the timer reservation signal reproduced by said timer reservation information reproducing means overlap each other in terms of time, executes the timer reservation based on the timer reservation information on the timer reservation information signal reproduced by said timer reservation information reproducing means.

3. A timer reservation apparatus of a disk recording and reproducing apparatus as claimed in claim 1, a timer reservation apparatus of a disk recording and reproducing apparatus, being characterized by being arranged such that said timer reservation executing means, when the timer reservation information on the timer reservation information signal reproduced by said timer reservation information reproducing means overlaps on a recording reservation and a reproducing reservation in terms of timer, executes the timer reservation based on the timer information on the timer reservation information signal of said recording reservation.

4. In a timer reservation apparatus of a disk recording and reproducing apparatus as claimed in claim 1, a timer reservation apparatus of a disk recording and reproducing apparatus, being characterized in that said timer reservation executing means comprises:

a detecting means which, in a case when the timer reservation information on the timer reservation information signal reproduced by said timer reservation information reproducing means and the timer reservation information on the timer reservation information signal about to be recorded in said predetermined area of the disc by said timer reservation information reservation and the reproducing reservation in view of time, detects the time overlap, and a notifying means notifying of said detecting means.

5. In a timer reservation apparatus of a disc recording and reproducing apparatus as claimed in claim 1, further including a first judging means for judging whether or not to record the same program in a disc at a given time;

a second judging means which, when it is judges that the same program is to be recorded in the disc at said given time, judges whether or not there remains an area for recording the program in the disc;

a first notifying means for notifying a user of whether to erase a previously recorded program when it is judged that there does not remain an area in said disc for recording a program by the second judging means, a third judging means for judging whether to erase the previously recorded program based on user's judgement, an erasing means for erasing the previously recorded program when it is judged that the previously recorded program is to be erased by the third judging means, a memory control means for reproducing the timer reservation information signal and the control signal recorded in said predetermined area of the disc by said timer reservation reproducing means and memorizing then in said timer reservation information memorizing means when it is judges that the previously recorded program is not to be erased by the third judging means, a disk ejecting control means for ejecting said disc after reproducing the timer reservation information signal as well as the control signal recorded in the predetermined area of the disc by said timer reservation information reproducing means and records them in said timer reservation information memorizing means, a second notifying means notifying the user that a new disc is about to be fit so that the timer reservation information signal as well as the control signal of said disc memorized in said timer reservation information memorizing means are to be recorded in a predetermined are of said new disc, and a fourth judging means for judging if said new disc is fit and whether or not the timer reservation information signal as well as the control signal of said disc memorized in said timer reservation information memorizing means have been recorded in a predetermined area of said new disc, and when it is judged that there remains an area in said disc memorized in said timer reservation information memorizing means for recording the program by said second judging means, an information signal is recorded in said disc and when it is judged that said new disc is fit and the timer reservation information signal as well as the control signal of said disc memorized in said timer reservation information memorizing means have been recorded in the predetermined area of said new disc, the information signal is to be recorded in said new disc.

6. In combination with a timer reservation apparatus of a disc recording and reproducing apparatus as claimed in claim 1, a disc in which said timer reservation information is recorded, characterized in that said timer reservation information signal for a disc recording and reproducing apparatus as well as said control signal indicating whether to allow or prohibit execution of said timer reservation information on a reservation signal registered on said disc recording and reproducing apparatus side are recorded in a predetermined area.

* * * * *